Nov. 28, 1967  T. A. MIDDLESWORTH  3,355,007
VARIABLE LENGTH CONVEYOR
Filed Sept. 13, 1966  2 Sheets-Sheet 1
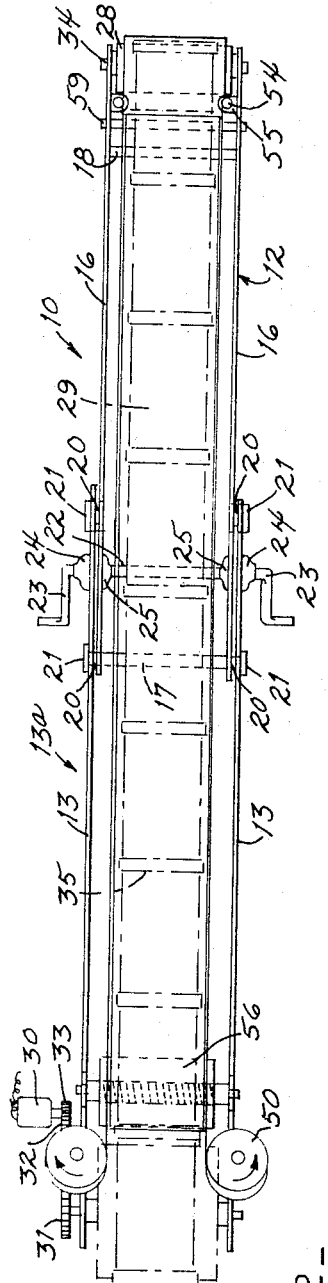
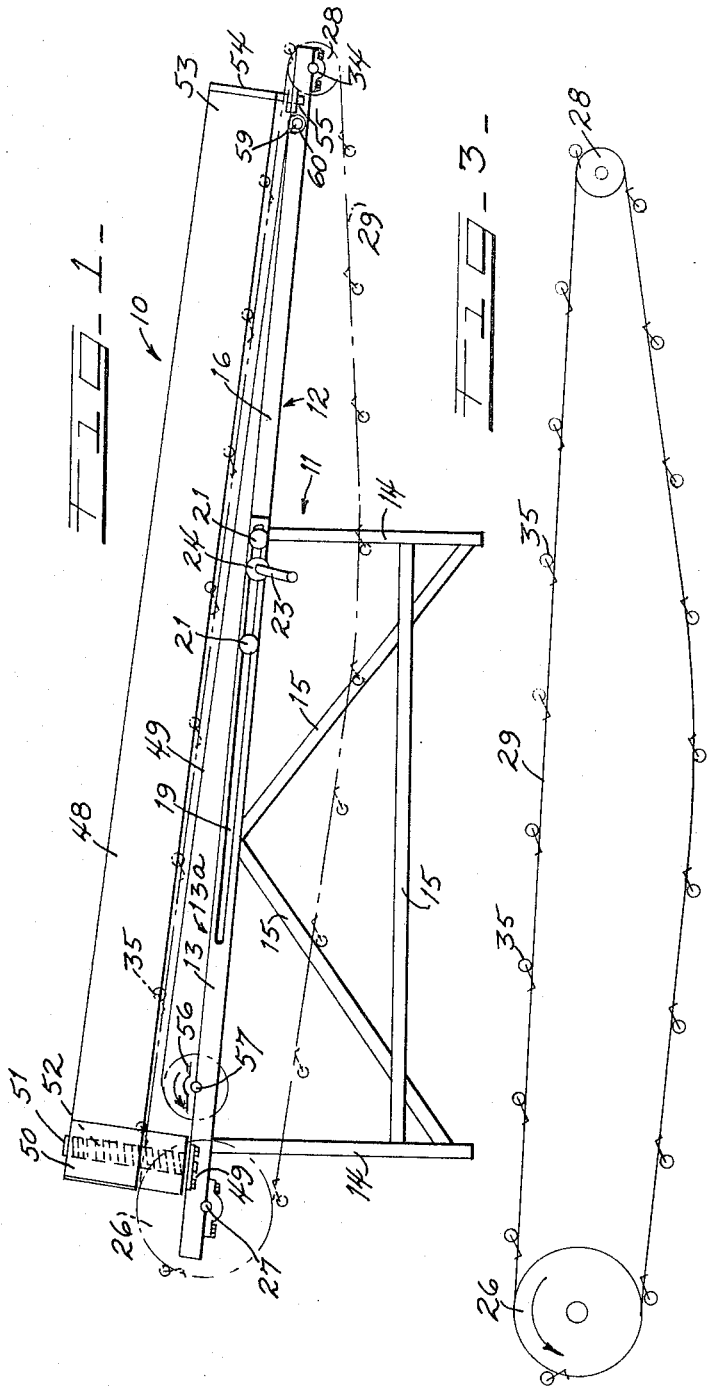
INVENTOR
TOMMY A. MIDDLESWORTH
BY
ATT'Y.

Nov. 28, 1967  T. A. MIDDLESWORTH  3,355,007
VARIABLE LENGTH CONVEYOR
Filed Sept. 13, 1966                                      2 Sheets-Sheet 2
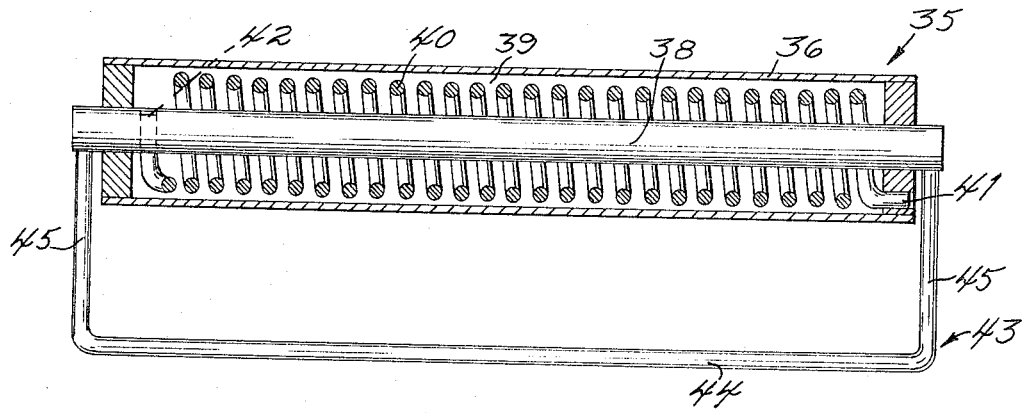
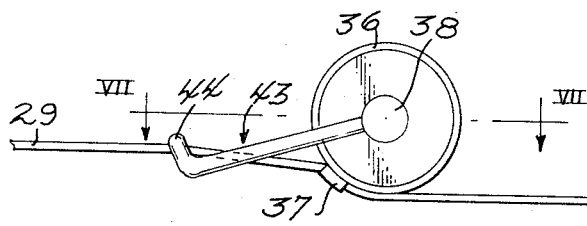
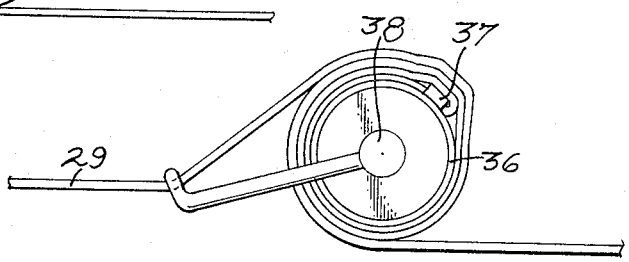
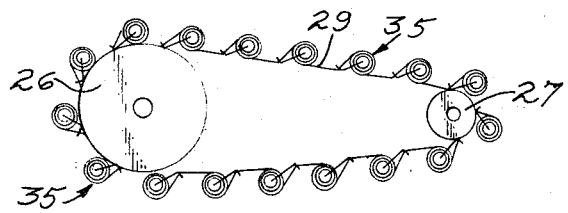
INVENTOR
TOMMY A. MIDDLESWORTH
BY
ATT'Y.

United States Patent Office 3,355,007
Patented Nov. 28, 1967

3,355,007
VARIABLE LENGTH CONVEYOR
Tommy A. Middlesworth, Hinsdale, Ill., assignor to International Harvester Company, Chicago, Ill., a corporation of Delaware
Filed Sept. 13, 1966, Ser. No. 579,058
4 Claims. (Cl. 198—139)

ABSTRACT OF THE DISCLOSURE

A variable length conveyor having longitudinally spaced pulleys over which is trained an endless, flexible belt. Spaced along the belt is a plurality of spring loaded flights, the flights being adapted to take up and let out portions of belt as the pulleys are adjusted to a plurality of longitudinal settings so that the effective carrying surface of the belt automatically conforms to any setting.

---

The present invention relates in general to conveyors and more particularly to conveyor belts for use with adjustable length conveyors and having belt take-up means for automatically maintaining belt operating tension at any adjustable length of the conveyor.

In the field of conveyors it is important to provide the right amount of belt tension. Thus in a variable length conveyor which employs an endless belt, the conveyor must be provided with belt take-up means to adjust the peripheral extent of the belt to conform to the adjusted conveyor length. Heretofore, this has been accomplished by auxiliary belt idler pulleys which are adjustable to take up belt slack and thereby maintain the desired belt tension. Such an arrangement, while attaining the principal object, presents inherent operational disadvantages. The additional belt take-up pulleys cause increased belt friction which reduces the life of the belt and requires additional power to propel the belt. Furthermore, the additional pulleys increase the number of moving parts and, hence, the number of possible failure points.

The general purpose of this invention is to provide a variable length conveyor having a conveyor belt which automatically conforms to any adjustable length of the conveyor. To attain this, the present invention contemplates a unique flight-belt arrangement whereby the flights, in response to belt tension, take up belt slack.

Since the self-adjusting feature of the conveyor belt is responsive to belt tension, this invention presents a further novel feature of maintaining belt operating tension irrespective of conveyor load or atmospheric conditions.

It is therefore an object of the present invention to provide an endless conveyor belt which automatically conforms to the longitudinal extent of the conveyor.

Another object is to minimize belt friction in a variable length conveyor.

A further object of the present invention is to provide a conveyor belt which automatically controls belt tension in response to belt loads.

Still another object of the present invention is the provision of spring loaded flights which automatically take up excessive belt slack.

A further object of the present invention is the provision of bottom and side walls which automatically conform to the longitudinal extent of the conveyor.

Other objects and a fuller understanding of the present invention may be had by referring to the following description and claims taken in conjunction with the accompanying drawings in which:

FIGURE 1 is a side elevational view of the conveyor constructed according to an embodiment of the invention;

FIGURE 2 is a plan view of the conveyor shown in FIGURE 1;

FIGURE 3 is a diagrammatic view illustrating the relationship of the belt, pulleys and flights of a conveyor shown in FIGURES 1 and 2, the conveyor shown in the extended position;

FIGURE 4 is a view similar to FIGURE 3, showing the relationship of the parts with the conveyor in a retracted position;

FIGURE 5 is a fragmentary enlarged view illustrating the relationship of the flight and the belt when the conveyor occupies a retracted position;

FIGURE 6 is a view similar to FIGURE 5 illustrating the relationship of the belt and the flight when the conveyor occupies the extended position, and FIGURE 7 is a cross-sectional view taken generally on line VII—VII of FIGURE 6.

With reference to FIGURES 1 and 2, the conveyor, shown generally at 10 comprises generally a stationary frame 11 and an extensible frame 12. The stationary frame 11 includes a pair of parallel inwardly facing channel members 13 supported by upright legs 14 which are braced by cross members 15.

The channel members 13 prescribe an outer conveying frame 13a which is adapted to receive a portion of the extensible frame 12. The extensible frame 12 is formed of outwardly facing channel members 16 connected at their opposite ends by cross members 17 and 18. The channel members 16 have secured to their outer sides rollers 20 which are mounted on bearings 21 which are, in turn, carried by channel members 13, and are longitudinally spaced with respect to each other so that the extensible frame 12 will be held co-planar with the outer conveying frame 13a.

Thus, the extensible frame 12 is movably carried on the outer conveying frame 13a; adjustment of the former with respect to the latter determines the longitudinal length of the conveyor.

The conveyor is provided with manual adjustment means including a shaft 22 which extends laterally through the channel members 13 and the channel members 16. A pair of handles 23 are keyed to opposite ends of the shaft 22. The handles 23 have formed therewith, respectively, flat flanges 24 which abut the outer side walls of the channel members 13. A pair of clamp plates 25 are threadedly mounted on the shaft 22 and are affixed to the inner walls of the channel members 16, so that rotation of the shaft 22 will clamp the extensible frame 12 to the outer conveying frame 13a in a rigid non-movable position. The handles 23 may also be grasped to move the extensible frame 12 to any desired position relative to the conveying frame 13a. The channel members 13 have an elongated slot 19 formed therein, respectively, to allow longitudinal movement of the shaft 22 with respect to the outer conveying frame 13a.

The outer conveying frame 13a has mounted at one end thereof a driver pulley 26 which is journaled in bearings 27. The extensible frame 12 has mounted at its distended end an idler pulley 28 and journaled to the frame 11 as at 34. A flexible endless belt 29 is trained over the driver pulley 26 and the idler pulley 28 and is frictionally engageable with the driver pulley 26 so that rotation of the latter propels the belt 29 along its track. The driver pulley 26 is drivingly connected to a prime mover 30 through a chain linkage which includes a pulley sprocket 31, a chain 32 and a prime mover sprocket 33.

As best seen in FIGURE 1, the flexible endless belt 29 has disposed at spaced intervals about its periphery a plurality of flights 35. Now, referring to FIGURES 5, 6 and 7, the individual flights 35 are seen to be particularly characterized as having a hollow cylindrical housing 36 which is held to the belt 29 by means of a loop 37 so that the flights 35 are orbitally carried by the belt 29. A shaft 38 passes axially through the housing 36 and laterally projects at both ends thereof. The shaft 38 and the housing 36 define an internal annular space 39 for receiving a torsion spring 40. One end of the torsion spring 40 is secured to the housing 36 as at 41, and the opposite end is affixed to the shaft as at 42. The shaft 38 has integrally formed therewith a U-shaped arm 43 which includes a cross member 44 disposed parallel to the shaft 38 and a pair of parallel legs 45 which connect the ends of the cross member 44 to the ends of the shaft 38. The shaft 38 is journalled to the end walls of the housing 36 so that the latter is free to rotate about the former.

As diagrammatically depicted in FIGURE 3, the peripheral extent of the belt 29 is maximum when the conveyor is operated in the fully extended position. As best seen in FIGURE 6, the housing 36 is attached to the belt by loop 37 and the cross member 44 of the arm 43 rides the outer surface of the belt 29 and transversely with respect thereto. A shaft torque created by the torsion spring 40 interconnecting the shaft 38 and the housing 36 tends to rotate the former about the latter in a counterclockwise direction. Thus it will be understood that when the belt tension is sufficient to withstand the resulting force acting on the cross member 44, the arm 43 and, hence, the shaft 38 will be prevented from rotating and a balanced condition will exist. The balanced condition results from equal but opposed torques acting on the shaft 38: shaft torque created by the torsion spring 40, hereafter called torsion spring torque, and acting in a counterclockwise direction is balanced by a clockwise torque created by the belt tension acting on the arm 43, hereafter called belt tension torque.

Now when the conveyor is adjusted to a retracted position, as diagrammatically shown in FIGURE 4, the resulting belt slack causes a reduction in belt tension. The arm 43 immediately senses the reduction in belt tension and transmits the same to the shaft 38 thereby reducing belt tension torque. Thus the torsion spring torque exceeds the belt tension torque, causing the housing 36 to rotate clockwise about the shaft 38. The loop 37 which is attached to the housing 36, pulls with it portions of the belt 29 thereby winding belt slack about the housing 36 in double layers. Rotation of the housing continues until all the belt slack is taken up and the belt tension is such to create sufficient belt tension torque to balance the torsion spring torque.

The present invention further contemplates the use of adjustable side walls 48 and a bottom wall 49 which automatically conform to the longitudinal extent of the conveyor 10. A spring loaded reel 50 is bolted to each of the channel members 13 shown generally at 49. The reel 50 has rotatably mounted therein a shaft 51 fastened to one end of the side wall 48. A torsion spring 52 biases the shaft 51 to wind the side wall thereabout. The side wall 48 has a distended or free end 53 attached to a rod 54 which engages the reel 50 in the fully retracted position and which may be grasped for manually unwinding the side wall 48 from the reel 50. In the extended position of the side wall 48, the rod 54 is inserted in a slot 55 formed in the channel member 16. Thus it will be understood that movement of the extensible frame 12 relative to the stationary frame 11 will cause the reel 50 to take up or let out portions of side wall 48 to conform to the longitudinal extent of the conveyor. The bottom wall 49 is also provided with a spring loaded reel 56 which automatically takes up or lets out portions of the bottom wall 49 in conformance with the longitudinal extent of the conveyor. The reel 56 is connected to the channel members 13 as at 57. The bottom wall 49 has one end fastened to the spring loaded reel 56 and a free end attached to a rod 59 which in operation is lodged in notches 60 formed in the channel member 16. The lateral edges of the bottom wall 49 abut the inner sides of the upright side walls 48 thereby in combination forming a trough through which the top run of the endless belt 29 passes. Thus when the conveyor is used to convey bulk material, the bulk material will be confined to the trough defined by the bottom and side walls.

In operation, let it be assumed that the conveyor is extended to the fully extended position as diagrammatically illustrated in FIGURE 3. In this position of the conveyor, the peripheral extent of the belt 29 is maximum, and the only contact between the flight and the belt is at a point near the loop 37 and the engagement of the arm 43 upon the belt.

Let it now be assumed the conveyor is retracted to the fully retracted position by manually moving the extensible portion 12 toward the driver pulley 26. This adjustment reduces the belt tension causing the flight 35 to rotate in clockwise direction thereby winding up portions of the belt until belt tension is sufficient to balance the torsion spring force.

As best seen in FIGURE 5, each flight 35 takes up a portion of the belt slack so that the size of each flight is not appreciably affected. Thus the peripheral extent of the belt 29 is made to conform exactly to the longitudinal spacing of the pulleys 26 and 27.

Concurrent with the automatic adjustment of the belt is the automatic adjustment of the side walls 48 and bottom wall 49. Retractable movement of the extensible frame 12 relative to the stationary frame 11 allows the spring loaded reels 50 and 56 to wind up the side walls 48 and the bottom wall 49, respectively. In adjusting the conveyor to an extended position, the operation is reversed; that is, the belt tension torque exceeds the torsion spring torque causing the housing 36 to rotate counterclockwise thereby unwinding wound-up portions of the belt 29 until the belt tension is reduced to a point that belt tension torque balances the torsion spring torque.

A particular advantageous feature of the present invention is its versatility. The adustment of the conveyor to any adjustable position may be made while the conveyor is in operation, thereby avoiding any shutdown time. Furthermore, since the self-adjustment characteristic of the conveyor is in response to belt tension, the conveyor automatically maintains belt operating tension irrespective of conveyor load.

Various modifications are contemplated and may obviously be resorted to by those skilled in the art without departing from the spirit and scope of the present invention, as hereinafter defined by the appended claims as only a preferred embodiment thereof has been disclosed.

What is claimed is:

1. A conveyor comprising a frame having longitudinally spaced portions; a driving pulley rotatably mounted on one of said portions; an idler pulley rotatably mounted on the other of said portions; a flexible belt trained over said driving and said idler pulleys; means for adjusting said pulleys relatively longitudinally to any one of several operating positions; a plurality of torsion spring members disposed at spaced intervals about the periphery of said flexible belt, said torsion spring members being biased to wind up belt slack in response to diminution in belt operating tension so that the peripheral extent of said belt automatically conforms to any one of said operating positions.

2. A conveyor comprising a frame having longitudinally spaced portions; a driving pulley rotatably mounted on one of said portions; an idler pulley rotatably mounted on the other of said portions; a flexible belt trained over said driving and said idler pulleys; a plurality of flights longitudinally spaced on said flexible belt, each of said flights including a body and a rotatable arm, said arm engageable with said flexible belt at a point longitudinally spaced from said flight, said arm being biased against said belt to cause the belt to rotate about said body whereby the arm wraps belt portions around the body in the direction of bias when the pulleys are moved longitudinally inwardly and the arm lets out wrapped up portions from the body when the pulleys are moved longitudinally outwardly.

3. The conveyor as defined in claim 2 wherein each of said flights includes a body transversely disposed on said belt, a radial arm rotatably connected to said body, said arm having a portion engageable with said belt, biasing means interconnecting said body and said arm for biasing the said arm in forceful engagement upon said belt so that changes in belt tension will cause arm movement, said biasing means in response to said arm movement causing said body to rotate thereby winding up portions of said belt in one direction of rotation and unwinding portions of said belt in the opposite direction of rotation.

4. A conveyor belt arrangement for use with a variable length conveyor, said belt arrangement comprising a flexible belt having an endless pulley engaging periphery; a plurality of flights disposed at spaced intervals lengthwise of said periphery, each of said flights including a hollow housing, a shaft rotatably mounted in said body, biasing means interconnecting said shaft and said hollow housing thereby creating a biasing spring torque in said shaft in one direction, means interconnecting said shaft and said belt for transmitting forces caused by belt tension to said shaft as a belt tension torque in a direction opposing said biasing spring torque whereby imbalance of said torque causes the hollow housing to rotate about said shaft taking up portions of said belt when said biasing spring torque exceeds said belt tension torque and for letting out portions of said belt when said belt tension torque exceeds said biasing spring torque.

References Cited

UNITED STATES PATENTS

| | | | |
|---|---|---|---|
| 344,405 | 6/1886 | Rollins | 198—204 X |
| 2,704,149 | 3/1955 | Huey | 198—102 X |
| 2,774,462 | 12/1956 | Poundstone | 198—184 X |
| 3,294,216 | 12/1966 | Girardi | 198—139 |

EDWARD A. SROKA, *Primary Examiner.*